(12) United States Patent
Buettiker et al.

(10) Patent No.: US 11,730,310 B2
(45) Date of Patent: Aug. 22, 2023

(54) BEVERAGE PREPARATION MACHINE FOR BREWED BEVERAGES HAVING A COVER PLATE FOR COVERING AN OPENING FORMED IN A HOUSING WALL

(71) Applicant: JURA Elektroapparate AG, Niederbuchsiten (CH)

(72) Inventors: Philipp Buettiker, Oberbuchsiten (CH); Pascal Ruetti, Neuendorf (CH)

(73) Assignee: JURA Elektroapparate AG, Niederbuchsiten (CH)

(*) Notice: Subject to any disclaimer, the term of this patent is extended or adjusted under 35 U.S.C. 154(b) by 531 days.

(21) Appl. No.: 16/971,792

(22) PCT Filed: Feb. 22, 2019

(86) PCT No.: PCT/CH2019/000005
§ 371 (c)(1),
(2) Date: Aug. 21, 2020

(87) PCT Pub. No.: WO2019/161513
PCT Pub. Date: Aug. 29, 2019

(65) Prior Publication Data
US 2021/0076868 A1 Mar. 18, 2021

(30) Foreign Application Priority Data
Feb. 23, 2018 (DE) .................... 20 2018 101 006.9

(51) Int. Cl.
A47J 31/36 (2006.01)
A47J 31/44 (2006.01)
(52) U.S. Cl.
CPC ....... *A47J 31/4407* (2013.01); *A47J 31/3619* (2013.01); *A47J 31/3633* (2013.01); *A47J 31/3638* (2013.01)

(58) Field of Classification Search
CPC ................ A47J 31/3619; A47J 31/3638; A47J 31/3671; A47J 31/4403; A47J 31/4407; E06B 5/006
See application file for complete search history.

(56) References Cited

U.S. PATENT DOCUMENTS

2018/0317695 A1* 11/2018 Eller .................. B65D 75/5827

FOREIGN PATENT DOCUMENTS

DE 10 2012 200 312 A1 7/2013
EP 0 783 859 A1 7/1997
(Continued)

OTHER PUBLICATIONS

English translation of International Preliminary Report on Patentability in PCT/CH2019/000005, dated Feb. 12, 2020.
(Continued)

*Primary Examiner* — Reginald Alexander
(74) *Attorney, Agent, or Firm* — Collard & Roe, P.C.

(57) ABSTRACT

A beverage preparation machine for brewed beverages includes a housing having a housing wall that surrounds an inner space and has an opening; a brewing device arranged in the inner space for brewing a quantity of a solid material accommodated by the brewing device, wherein the quantity of the solid material can be output from the brewing device; a movable container for receiving a quantity of the solid material output from the brewing device, which container can be brought into the inner space through the opening; a movable cover plate for covering the opening, which cover plate in a first position covers at least one region of the opening, and which in a second position uncovers the opening. The cover plate is connected to the housing via a pivoting device so that the cover plate is movable between the first and second positions by pivoting about a pivot axis.

14 Claims, 3 Drawing Sheets

(56) References Cited

FOREIGN PATENT DOCUMENTS

| | | | | |
|---|---|---|---|---|
| EP | 2792282 | A1 * | 10/2014 | .......... A47J 31/3623 |
| EP | 2 946 703 | A1 | 11/2015 | |
| EP | 3409148 | A1 * | 12/2018 | .............. A47J 31/00 |
| WO | WO-2012063273 | A1 * | 5/2012 | ............ A47J 31/005 |

OTHER PUBLICATIONS

International Search Report in PCT/CH2019/000005, dated May 14, 2019.
Letter to European Patent Office in PCT/CH2019/000005, dated Dec. 19, 2019.

* cited by examiner

BEVERAGE PREPARATION MACHINE FOR BREWED BEVERAGES HAVING A COVER PLATE FOR COVERING AN OPENING FORMED IN A HOUSING WALL

CROSS REFERENCE TO RELATED APPLICATIONS

This application is the National Stage of PCT/CH2019/000005 filed on Feb. 22, 2019, which claims priority under 35 U.S.C. § 119 of German Application No. 20 2018 101 006.9 filed on Feb. 23, 2018, the disclosure of which is incorporated by reference. The international application under PCT article 21(2) was not published in English.

TECHNICAL FIELD

The invention relates to a beverage preparation machine for brewed beverages.

PRIOR ART

Known beverage preparation machines of the type named above are intended for the preparation of brewed beverages such as for example coffee, tea or suchlike and usually comprise a housing with a housing wall, which surrounds an inner space and has at least one opening, and a brewing device arranged in the inner space for producing a brewed beverage (e.g. coffee, tea, etc.) by brewing a quantity of a solid material (e.g. coffee powder, leaves and/or leaf buds of tea plants, etc.) accommodated by the brewing device, with a brewing fluid (e.g. water), wherein the quantity of the solid material accommodated by the brewing device can be output from the brewing device.

In order to enable a hygienic disposal of the quantity of the respective solid material used for brewing, such beverage preparation machines are generally equipped with a movable container which is able to be brought into the inner space through the opening formed in the housing wall, and is suitable for receiving a quantity of the solid material output from the brewing device. To ensure that this container in normal operation of a beverage preparation machine is not visible from the outer side of the beverage preparation machine, generally in addition a movable cover plate is present to cover the opening, wherein the cover plate can be brought at least into a first position and into a second position and, furthermore, is configured in such a way that in the first position it covers and/or closes at least one region of the opening, and in the second position it uncovers the opening in such a way that the container can be moved through the opening.

In order to be able to introduce the container, which is intended to receive the quantity of the solid material respectively used for brewing, easily through the opening into the inner space of the beverage preparation machine, beverage preparation machines of the type named above are typically equipped with a carrier for the container, wherein the carrier is formed in such a way that the container is able to be placed in a predefined region of the carrier, and the carrier, in so far as the cover plate is situated in the second position, together with the container placed in the predefined region, is able to be introduced through the opening into the inner space, and the container is able to be brought here to a predefined position in the inner space which is selected in such a way that the cover plate is able to be brought into the first position, after the container is brought to the predefined position in the inner space.

In operation of a beverage preparation machine, typically so-called "residual fluids" occur, which are not components of a brewed beverage produced by the beverage preparation machine and therefore must be separated from the respectively produced brewed beverages during the operation of the beverage preparation machine, and finally disposed of. In this context, "residual fluids" are to be understood to mean for example the components of the brewing fluid used during brewing which during brewing are absorbed in the quantity of the respective solid material received by the brewing device and if applicable can only run out gradually from the brewing device a long time after the brewed beverage produced during brewing was output from the beverage preparation machine. In this context, "residual fluids" are for example also to be understood as fluid cleaning agents which are brought in contact for cleaning purposes with the regions of a beverage preparation machine which come in contact with the brewing fluid or with the produced brewed beverage in operation of the beverage preparation machine. In order to enable an easy and hygienic disposal of the residual fluids, beverage preparation machines of the type named above are usually equipped with a residual fluid container which serves to receive residual fluids during the operation of the beverage preparation machine and for this purpose must generally be placed in the inner space of the beverage preparation machine at least during the operation of the beverage preparation machine, in order to be able to receive the respective residual fluids in a simple manner.

In order to enable a simple operation of beverage preparation machines of the above-mentioned type, with regard to a disposal of the solid material used during brewing and a disposal of the residual fluids occurring during operation, it has proved to be expedient to form the container for receiving the solid material output from the brewing device, the carrier for the above-mentioned container, the residual fluid container for receiving residual fluids and the cover plate for covering the opening in such a way that the above-mentioned container, the carrier for the container, the residual fluid container and the cover plate are able to be put together to form an assembly which in the assembled state is able to be placed as a whole relative to the housing of the beverage preparation machine. For the sake of simplicity, the opening in the housing of the beverage preparation machine is formed in this case in such a way that the above-mentioned assembly in the assembled state as a whole is able to be introduced through the opening into the inner space of the beverage preparation machine in such a way that when the container for receiving the solid material output from the brewing device, and the residual fluid container are placed at respectively predefined positions, the cover plate is brought automatically into the first position, in which the cover plate covers the opening in a predefined manner.

In order to enable an easy handling of the above-mentioned assembly, the cover plate is generally fastened to the carrier for the container intended to receive the solid material and accordingly forms a unit together with the carrier. In addition, the residual fluid container can be integrated into the carrier for the container intended for receiving the solid material, and accordingly can form a unit together with the carrier and the cover plate. In this way, it is advantageously achieved that the above-mentioned assembly can be composed of as small a number of individual parts as possible (for example two or three individual parts).

The above-mentioned fastening of the cover plate on the carrier for the container intended to receive the solid material also has disadvantages, however. The opening formed in the housing wall, which is to be covered by means of the cover plate, is generally situated at the front face of the beverage preparation machine, and the cover plate is therefore to harmonize with the housing wall of the beverage preparation machine already for aesthetic reasons. Consequently, the cover plate is generally made from the same, relatively high-quality and aesthetically appealing materials as the housing wall of the beverage preparation machine itself. According to the design of the housing wall, the cover plate can be, for example, lacquered or even chromed. On the other hand, the carrier for the container intended to receive the solid material is generally relatively intensively contaminated during the operation of the beverage preparation machine, especially since residues of the solid material used for brewing, the residual fluids and the respectively produced brewed beverages are regularly deposited on the carrier. Accordingly, the carrier for the container intended to receive the solid material, and the residual fluid container, must be regularly subjected to a cleaning. As the cover plate is generally made from the same, relatively high-quality materials as the housing wall of the beverage preparation machine, such a cleaning must be carried out in a particularly gentle manner and generally manually. It is, for example, not advisable to clean the carrier together with the cover plate, fastened to the carrier, in a dishwasher, because the surfaces of the cover plate can become discoloured or can even be damaged during a cleaning in a dishwasher. This means a considerable extra effort for a user owing to the necessity of having to carry out the cleaning of the carrier manually at regular time intervals.

The publication DE 10 2012 200 312 A1 discloses a beverage preparation machine for brewed beverages in the form of a fully automatic coffee machine, which is intended for installation into an installation niche of a piece of kitchen furniture and has a housing with a front wall, wherein in a first portion of the front wall there are placed operating elements for operating the fully automatic coffee machine, and an outlet for coffee beverages, and in a second portion of the front wall an opening is formed in the front wall through which a service compartment, arranged behind the front wall in an inner space of the automatic coffee machine, is accessible. The service compartment serves in particular to accommodate various containers which can be brought into the service compartment through the opening or respectively can be removed from the service compartment through the opening, and are required for an operation of the fully automatic coffee machine, in particular a storage container for coffee beans and a disposal container to receive brewed coffee powder, which was brewed with water for the production of a coffee beverage in a brewing device of the fully automatic coffee machine. In the region of the second portion of the front wall a movable door is arranged, which serves to close the opening formed in the second portion of the front wall, and if required can be brought into a position in which the door does not close the opening, so that the service compartment is accessible through the opening. For this purpose, the door is mounted in such a way that the door is pivotable about a vertical pivot axis, wherein the vertical pivot axis is guided horizontally along a guide track, so that the door is movable along the guide track into the service compartment and at least a portion of the door is retractable in the service compartment. Such a mounting of the door is complex.

SUMMARY OF THE INVENTION

The present invention is therefore based on the problem of providing a beverage preparation machine for brewed beverages, which prevents the above-mentioned disadvantages and in particular enables a more efficient cleaning.

This problem is solved according to the invention by a beverage preparation machine for brewed beverages having the features as recited in the claims.

This beverage preparation machine for brewed beverages comprises: a housing with a housing wall, which surrounds an inner space and has at least one opening; a brewing device arranged in the inner space for producing a brewed beverage by brewing a quantity of a solid material, accommodated by the brewing device, with a brewing fluid, wherein the quantity of the solid material accommodated by the brewing device can be output from the brewing device; a movable container for receiving a quantity of the solid material output from the brewing device, which container is configured to be brought through the opening into the inner space, and a movable cover plate for covering the opening, wherein the cover plate is enabled to be brought at least into a first position and into a second position and is formed in such a way that in the first position it covers and/or closes at least one region of the opening and in the second position uncovers the opening in such a way that the container is enabled to be moved through the opening.

The cover plate is connected to the housing via a pivoting device, so that the cover plate is pivotable about a pivot axis and, by pivoting about this pivot axis, is movable between the first position and the second position, wherein the pivoting device comprises a first lever arm which is securely connected to the cover plate and is mounted rotatably about the pivot axis.

According to the invention, the pivoting device has a second lever arm which is rotatably mounted on the first lever arm, so that the second lever arm is rotatable with respect to the first lever arm about a rotation axis which is arranged substantially parallel to the pivoting axis and at a distance from the pivoting axis, wherein the pivoting device comprises furthermore a first guide device which is formed to guide a first portion of the second lever arm along a first guide curve, wherein the first guide curve extends in such a way that the first portion of the second lever arm on a pivoting movement of the cover plate between the first position and the second position is moved along the first guide curve. A spring element is arranged in such a way that a first portion of the spring element is fastened to the second lever arm at a distance from the rotation axis, and a second portion of the spring element is fixed relative to the first lever arm and/or to the housing.

Through the fact that the cover plate is connected to the housing of the beverage preparation machine via the pivoting device, and by pivoting about the pivot axis is movable between the first position and the second position, the container intended to receive the solid material (if applicable together with further components of the beverage preparation machine) can be removed from the inner space, without the cover plate together with the container having to be removed from the beverage preparation machine (and if applicable with further components of the beverage preparation machine): The cover plate remains on the housing of the beverage preparation machine when the container (if applicable together with further components of the beverage preparation machine) is removed from the inner space and is subjected to a cleaning. Under these circumstances, it is possible to manufacture the container and all further parts which must be removed from the beverage preparation machine for cleaning purposes exclusively from materials which are suitable for cleaning in a dishwasher. This enables an easy cleaning in a way which is time-saving and convenient for a user.

Through the fact that the pivoting device comprises a first lever arm which is securely connected to the cover plate and is mounted rotatably about the pivot axis. In this cast, the pivoting device offers the advantage that the first lever arm offers a variety of possibilities for fastening the cover plate to the housing, wherein a designer of the beverage preparation machine can make use of the freedom of selecting the shape and size of the first lever arm, in order to enable an advantageous arrangement of the cover plate. The first lever arm makes it possible in particular to freely select the arrangement of the pivot axis relative to the cover plate.

The beverage preparation machine is characterized in that the pivoting device has a second lever arm, which is rotatably mounted on the first lever arm, so that the second lever arm is rotatable with respect to the first lever arm about a rotation axis which is arranged substantially parallel to the pivot axis and at a distance from the pivot axis, wherein the pivoting device comprises in addition a first guide device which is formed to guide a first portion of the second lever arm along a first guide curve, wherein the first guide curve extends in such a way that the first portion of the second lever arm on a pivoting movement of the cover plate between the first position and the second position is moved along the first guide curve. The first lever arm and the second lever arm form in this case a toggle lever, which—depending on the position of the second lever arm relative to the first lever arm—can be brought into different positions and is accordingly suited to transfer relatively great torques to the cover plate in various ways. Through a suitable selection of the arrangement of the second lever arm relative to the first lever arm, it is therefore possible to control the generation of torques which act on the cover plate and in this way to control a movement of the cover plate between the first position and the second position. The respective arrangement of the second lever arm relative to the first lever arm is determined here—depending on the respective position of the cover plate—by the shape of the first guide curve.

The beverage preparation machine is equipped furthermore with a spring element, wherein a first portion of the spring element is fastened to the second lever arm at a distance from the rotation axis, and a second portion of the spring element is fixed relative to the first lever arm and/or to the housing. Such a spring element is generally elastically deformable and is accordingly suited, depending on its elastic deformation, to generate a force which acts directly on the second lever arm and—as the second lever arm is rotatably mounted on the first lever arm—can indirectly act on the first lever arm and therefore also on the cover plate.

In particular, it is able to be realized here that the spring element is pre-stressed, so that by means of the spring element a torque, acting on the second lever arm, is able to be generated with respect to the rotation axis. The extent and direction of the respectively generated torque depend on the respective arrangement of the spring element relative to the second lever arm.

Accordingly, it is in particular possible to be realized that, if the cover plate is situated in the first position, the second lever arm is arranged relative to the first lever arm in such a way that the spring element generates a torque, acting on the second lever arm, with respect to the rotation axis, which is directed in such a way that the cover plate is held in the first position by means of the torque generated by the spring element. For this purpose, the spring element can be pre-stressed in such a way that the spring element generates via the second lever arm a first torque acting on the first lever arm, which torque compensates the torque acting on the first lever arm, which the cover plate generates owing to its weight onto the first lever arm, when the cover plate is situated in the first position. In this way, it is possible to hold the cover plate in such a way that the cover plate is situated in a stable equilibrium position when it is brought into the first position.

In a further variant, the beverage preparation machine can be equipped with a first mechanical stop for the first lever arm and/or for the second lever arm, wherein the first mechanical stop is arranged in such a way that the first lever arm and/or the second lever arm is (or respectively are) in contact with the first mechanical stop, if the cover plate is brought into the first position, wherein the first lever arm and/or the second lever arm is (or respectively are) pressed by means of the torque generated by the spring element against the first mechanical stop. In this variant, the first lever arm, the second lever arm and the cover plate are situated respectively in a stable equilibrium position when the cover plate is brought into the first position. In order to bring the cover plate out of this stable equilibrium position, it is necessary in this case to overcome a restoring force able to be generated by the spring element, which restoring force acts on the first lever arm and is all the greater, the more intensively the spring element is pre-stressed.

Furthermore, the beverage preparation machine can be equipped with a sensor which is formed to detect whether the first lever arm is brought in contact with the first mechanical stop, and/or to detect whether the second lever arm is brought in contact with the first mechanical stop. The sensor is accordingly suited to monitor whether the cover plate is brought into the first position and accordingly currently covers or respectively closes the opening. The sensor is formed to generate a signal which contains corresponding information with respect to the position of the cover plate. This signal generated by the sensor can be made available to a control device of the beverage preparation machine, in order to enable a control of the beverage preparation machine depending on the signal.

Additionally or alternatively, the beverage preparation machine is able to be realized in such a way that, if the cover plate is situated in the first position or in an intermediate position between the first position and the second position, the second lever arm is arranged relative to the first lever arm in such a way that the spring element generates a torque, acting on the second lever arm, with respect to the rotation axis, which torque is directed in such a way that the cover plate is movable into the second position by means of the generated torque. In this case, it is achieved that the cover plate is moved out of a position in which the cover plate substantially covers the opening, owing to the torque generated by the spring element automatically into the second position, in which the cover plate does not cover the opening. Whether the spring element is able to generate the corresponding torque when the cover plate is situated in the first position, or whether the spring element is able to only generate the corresponding torque when the cover plate is situated in an intermediate position between the first position and the second position ("intermediate position" means in this context that the cover plate is situated on a path between the first position and the second position both at a distance from the first position and also at a distance from the second position) depends here on the arrangement of the first lever arm relative to the second lever arm and can be set by a corresponding construction of the first lever arm, of the second lever arm and of the first guide curve (in accordance with the wishes of the users of the beverage preparation machine).

The beverage preparation machine is able to be realized in particular in such a way that the cover plate is able to be held in the second position by means of the torque generated by the spring element.

For this purpose, the spring element can be pre-stressed in such a way that the spring element generates a first torque acting on the first lever arm via the second lever arm, which torque compensates for the torque acting on the first lever arm, which the cover plate generates owing to its weight on the first lever arm when the cover plate is situated in the second position. In this way, it is possible to hold the cover plate in such a way that the cover plate is situated in a stable equilibrium position when it is brought into the second position.

Additionally or alternatively, the beverage preparation machine can be equipped with at least a second mechanical stop for the first lever arm and/or for the second lever arm, wherein the at least one second mechanical stop is arranged in such a way that the first lever arm and/or the second lever arm is (or respectively are) in contact with the at least one second mechanical stop, if the cover plate is brought into the second position, wherein the first lever arm and/or the second lever arm is (or respectively are) pressed by means of the torque generated by the spring element against the at least one second mechanical stop.

According to a further development of the above-mentioned embodiments, the beverage preparation machine can be formed in such a way that the pivoting device comprises a second guide device, which is formed to guide a second portion of the second lever arm along a second guide curve, wherein the second guide curve extends in such a way that the second portion of the second lever arm on a pivoting movement of the cover plate is moved between the first position and the second position along the second guide curve. The second guide device improves the mechanical stability of the pivoting device.

According to a further development of the above-mentioned embodiment, the beverage preparation machine can be additionally equipped with a carrier for the container, wherein the carrier is formed in such a way that the container is able to be placed in a predefined region of the carrier, and the carrier, in so far as the cover plate is situated in the second position, is able to be introduced together with the container, placed in the predefined region, through the opening into the inner space, and the container is able to be brought here to a predefined position in the inner space which is selected in such a way that the cover plate is able to be brought into the first position. The carrier makes it possible in a convenient manner to introduce the container from the outer environment of the beverage preparation machine into the inner space, to position it in the inner space and to remove it from the inner space again, if necessary.

Alternatively or additionally, the carrier together with the container placed in the predefined region can be able to be guided out from the inner space along a predefined path through the opening, and the cover plate can be shaped in such a way that, in so far as the cover plate is situated in the first position, at least one region of the container and/or at least one region of the carrier is able to be brought into a mechanical contact with the cover plate when the carrier together with the container, placed in the predefined region, is guided out from the inner space along the predefined path through the opening.

In this case, the beverage preparation machine can also be realized in particular in such a way that the cover plate can be brought into a mechanical contact with the at least one region of the container and/or with the at least one region of the carrier in such a way that the cover plate can be taken along with the container and/or with the carrier and in so doing is pivotable out from the first position around the pivot axis, when the carrier together with the container placed in the predefined region is guided out from the inner space along the predefined path through the opening. In this realization of the beverage preparation machine, the cover plate can be situated first of all in a stable equilibrium position, when the cover plate is brought into the first position. When the carrier is now moved along the predefined path through the opening, the cover plate is automatically moved along together with the carrier or respectively with the container, so that the cover plate is conveyed out from the first position at least into an intermediate position between the first position and the second position. In this case, the spring element can be formed in such a way that the cover plate, owing to a torque generated by the spring element, acting on the first lever arm—proceeding from the intermediate position is automatically conveyed into the second position.

In a further development of the above-mentioned embodiments, the carrier can comprise a residual fluid container for receiving a residual fluid, which is able to be delivered in an operation of the beverage preparation machine.

The above-mentioned beverage preparation machines are able to be realized in such a way that the brewing device is formed for producing at least one of the following brewed beverages: coffee and/or tea.

BRIEF DESCRIPTION OF THE DRAWINGS

Further details of the invention and in particular exemplary embodiments of the device according to the invention are explained below with the aid of the enclosed drawings. There are shown.

DESCRIPTION OF EMBODIMENTS

Figure 1:
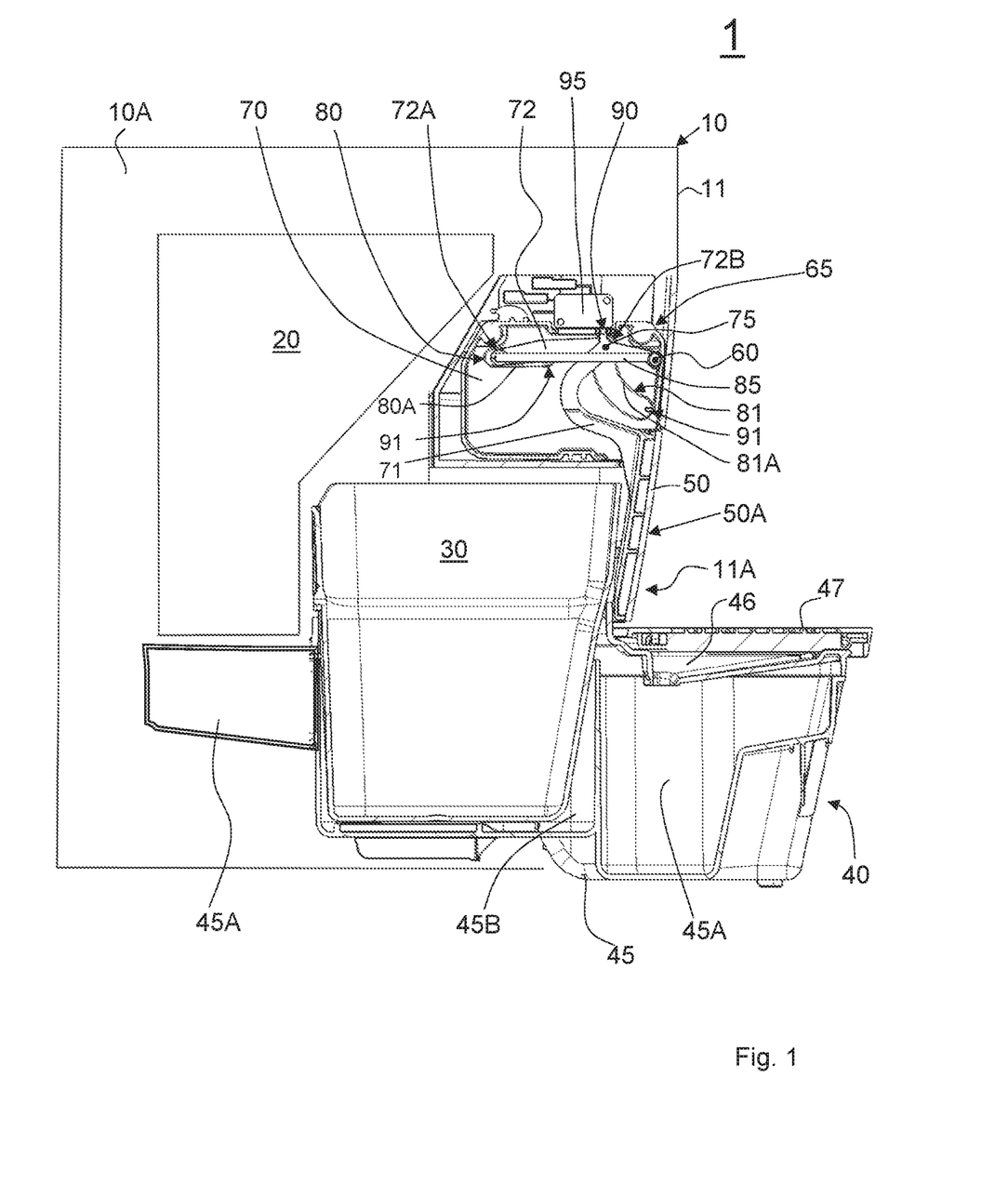
FIG. 1 a diagrammatic illustration of a beverage preparation machine according to the invention, with a container introduced through an opening in a housing wall into an inner space of the beverage preparation machine, and with a cover plate for covering the opening, wherein the cover plate is brought into a first position.
Figure 2:
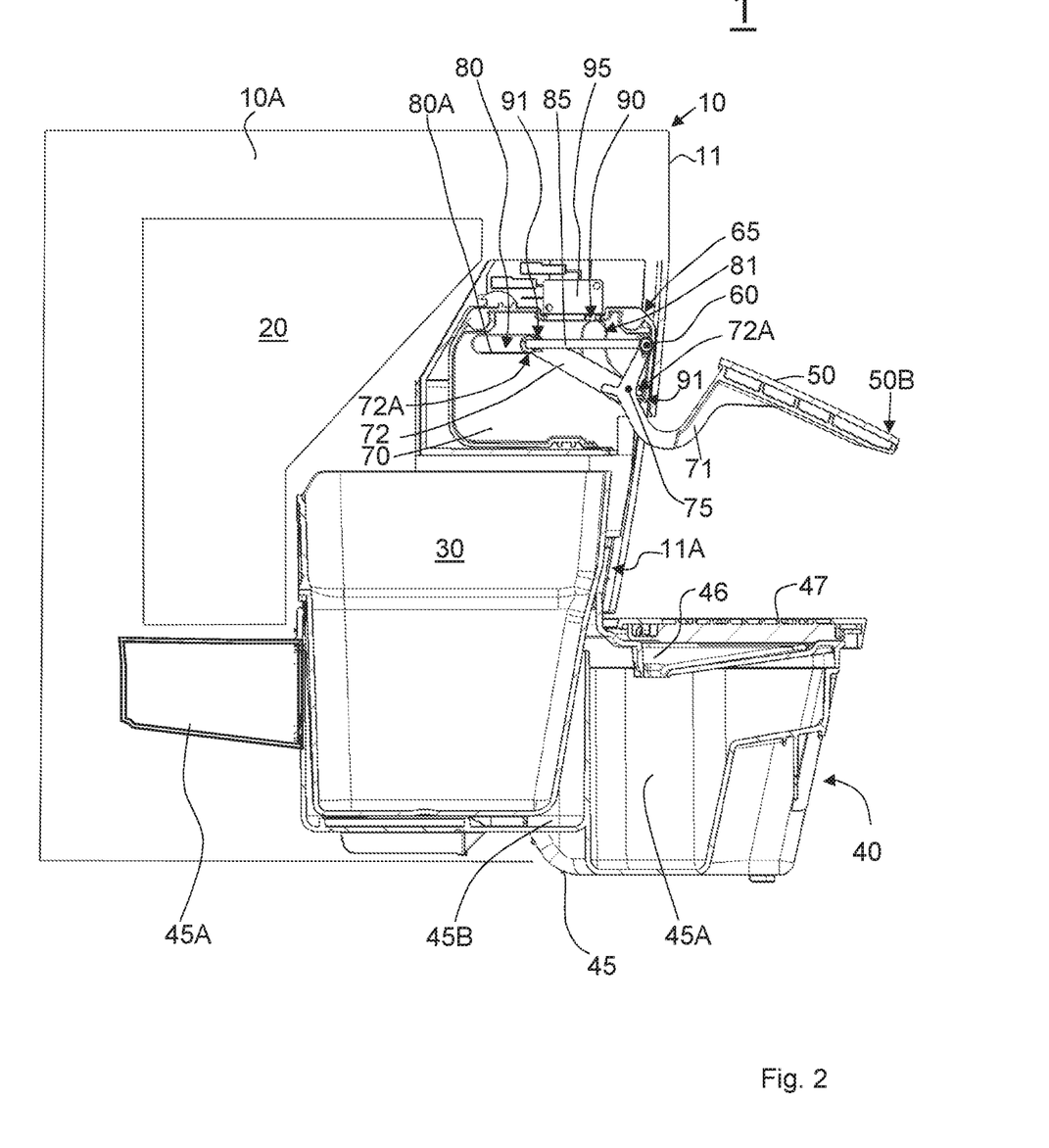
FIG. 2 the beverage preparation machine according to FIG. 1, wherein the cover plate is brought into a second position.
Figure 3:
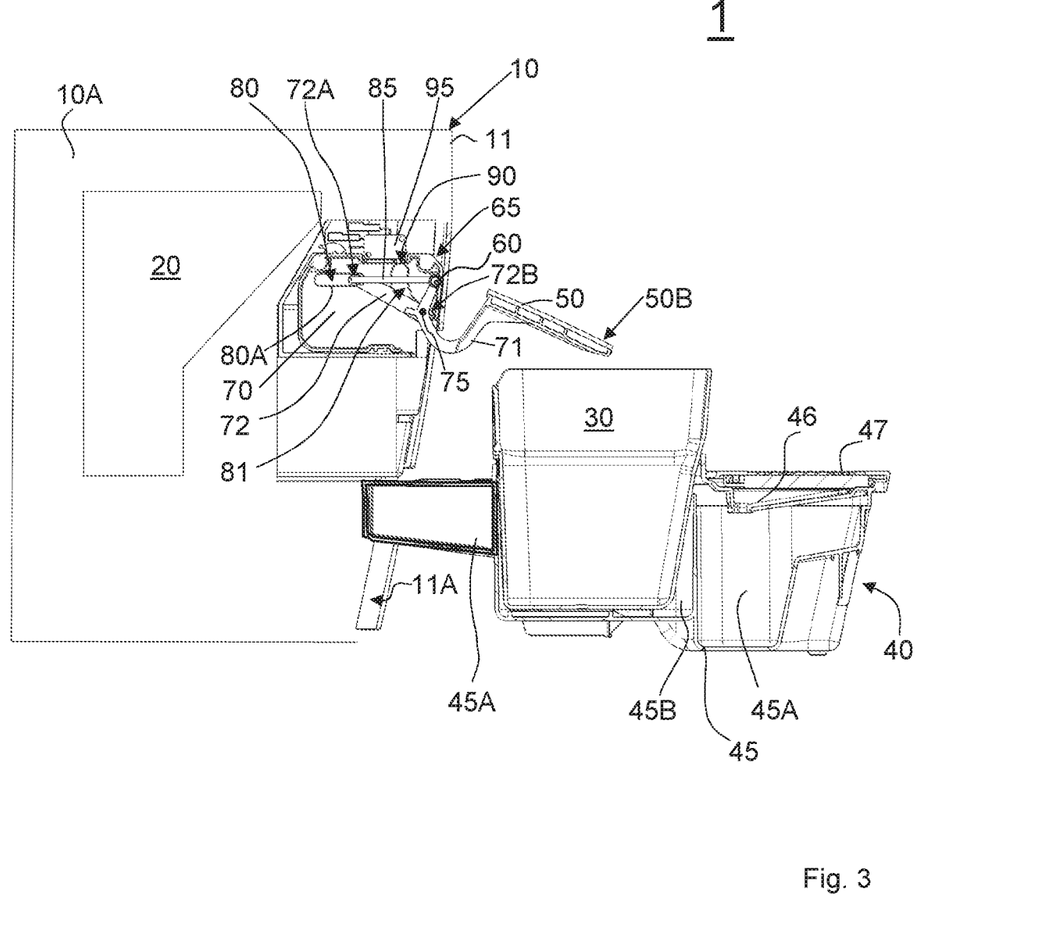
FIG. 3 the beverage preparation machine according to FIG. 2, wherein the container is placed outside the inner space.

FIG. 1-3 show a beverage preparation machine 1 for brewed beverages according to the invention, which in the present example is designed as a coffee machine for the production of coffee drinks. The type of brewed beverages is not relevant for the following presentation, so that the following explanations can also be regarded as applicable for beverage preparation machines which serve for the production of brewed beverages other than coffee.

As can be seen from FIG. 1-3, the beverage preparation machine 1 comprises a housing 10 with a housing wall 11, which surrounds an inner space 10A and has at least one opening 11A, and a brewing device 20, arranged in the inner space 10A, for production of a brewed beverage by brewing a quantity of a solid material (e.g. coffee powder), accommodated by the brewing device 20, with a brewing fluid (e.g. water, preferably hot water), wherein the quantity of the solid material accommodated by the brewing device 20 can be output from the brewing device 20.

In order to enable an easy disposal of the solid material output from the brewing device, a movable container 30 is present, which is suited to receive a quantity of the solid material output from the brewing device 20 and for this purpose can be brought through the opening 11A into the inner space 10A of the beverage preparation machine 1.

In FIGS. 1 and 2 the container 30 is illustrated in a situation in which the container 30 is brought into a predefined position relative to the brewing device 20, in which a quantity of the solid material output from the brewing device 20 can be conveyed in a conventional manner automatically into the container 30. Details for the filling of the container 30 with the solid material output from the brewing device 20 are not relevant in this context and are therefore not explained further.

The beverage preparation machine 1 comprises furthermore a movable cover plate 50 for covering the opening 11A. The cover plate 50 can be brought at least into a first position 50A (as illustrated in FIG. 1) and into a second position 50B (as illustrated in FIGS. 2 and 3). Furthermore, the cover plate 50 is shaped in such a way that in the first position 50A it covers and/or closes at least one region of the opening 11A (FIG. 1) and in the second position 50B it uncovers the opening 11A in such a way that the container 30 can be moved through the opening 11A (FIGS. 2 and 3).

The cover plate 50 is connected in particular to the housing 10 via a pivoting device 65, which has a pivot axis 60 and holds the cover plate 50 movably in such a way that the cover plate 50 is pivotable about the pivot axis 60 and, by pivoting about this pivot axis 60, can be moved between the first position 50A and the second position 50B. The cover plate 50 is pivotable about the pivot axis 60 continuously in particular in such a way that the cover plate 50 can be brought into any desired intermediate position between the first position 50A and the second position 50B.

As can be seen from FIG. 1-3, all components of the pivoting device 65 are fastened to a substantially flat mounting plate 70, which is arranged in the inner space 10A on the housing wall 11 in the vicinity of the opening 11A. In the present example, the pivot axis 60 is directed substantially perpendicularly to a surface of the mounting plate 70.

The pivoting device 65 comprises a first lever arm 71, which is securely connected at one of its two ends to the cover plate 50 and at the other of its two ends is rotatably mounted on the mounting plate 70 by means of a rotary bearing about the pivot axis 60, so that the cover plate 50 is pivotable about the pivot axis 60.

The pivoting device 65 has, furthermore, a second lever arm 72, which is rotatably mounted on the first lever arm 71, so that the second lever arm 72 is rotatable with respect to the first lever arm 71 about a rotation axis 75, which is arranged substantially parallel to the pivot axis 60 and at a distance from the pivot axis 60. In this way, the first lever arm 71 and the second lever arm 72 together form a toggle lever, which can be brought into different positions in that the second lever arm 72 is rotatable about the rotation axis 75 with respect to the first lever arm 71. By rotating the first lever arm 71 about the pivot axis 60 and by rotating the second lever arm 72 about the rotation axis 75 relative to the first lever arm 71, the first lever arm 71 and the second lever arm 72 are movable substantially parallel to a surface of the mounting plate 70.

The pivoting device 65 comprises furthermore a first guide device 80, which is formed to guide a first portion 72A of the second lever arm 72 along a first guide curve 80A, wherein the first guide curve 80A extends in such a way that the first portion 72A of the second lever arm 72 on a pivoting movement of the cover plate 50 is moved between the first position 50A and the second position 50B along the first guide curve 80A. In the present example, the first guide device 80 is realized in the form of an elongated slot which is formed in the mounting plate 70 in such a way that it extends substantially in the direction of a horizontal (FIG. 1-3). The first portion 72A of the second lever arm 72 is formed at an end of the second lever arm facing away from the rotation axis 75 and is shaped in such a way that the first portion 72A of the second lever arm 72 projects into the slot, which forms the first guide device 80. The first portion 72A of the second lever arm 72 is moved on a pivoting movement of the cover plate 50 between the first position 50A and the second position 50B in the longitudinal direction of the above-mentioned slot, i.e. the first guide curve 80A extends accordingly in the longitudinal direction of this slot.

As can be seen from FIG. 1-3, the second lever arm 72 comprises a second portion 72B, which is formed at an end of the second lever arm 72 lying opposite the first portion 72A. In the present example, the rotation axis 75 is arranged in such a way that the rotation axis 75 crosses the second lever arm 72 in the second portion 72B.

As FIG. 1-3 indicate, the pivoting device 65 can optionally comprise a second guide device 81, which is formed to guide the second portion 72B of the second lever arm 72 along a second guide curve 81A, wherein the second guide curve 81A extends in such a way that the second portion 72B of the second lever arm 72 on a pivoting movement of the cover plate 50 between the first position 50A and the second position 50B is moved along the second guide curve 81A. In the present example, the second guide device 81 is realized in the form of an elongated slot, which is formed in the mounting plate 70. The second portion 72B of the second lever arm 72 is shaped in such a way that this second portion 72B projects into the slot which forms the second guide device 81. The second portion 72B of the second lever arm 72 is moved upon a pivoting movement of the cover plate 50 between the first position 50A and the second position 50B in the longitudinal direction of the above-mentioned slot, i.e. the second guide curve 81A extends accordingly in the longitudinal direction of this slot. As the rotation axis 75 crosses the second lever arm 72 in the second portion 72B, the rotation axis 75 is likewise guided along the second guide curve 81A when the cover plate 50 is pivoted between the first position 50A and the second position 50B. Accordingly, in the present example, the second guide curve 81A extends substantially along a circumferential line of a circle, the centre point of which is defined by the pivot axis 60.

As can be seen from FIG. 1-3, the pivoting device 65 comprises a spring element 85. In the present example, the spring element 85 is realized as an elongated band of an elastic material, but could be replaced by a spring element according to another construction. A first portion of the spring element 85 is fastened to the second lever arm 72 at a distance from the rotation axis 75 (for example in the region of the first portion 72A of the second lever arm 72) and a second portion of the spring element 85 is fixed relative to the first lever arm 71 or respectively to the housing 10. In the present example, the above-mentioned first portion of the spring element 85 and the above-mentioned second portion of the spring element 85 form the two opposite ends of the element 85, wherein one of the ends of the spring element 85 is fixed to the pivot axis 60.

In the present example, the spring element 85 is pre-stressed, so that by means of the spring element 85 a torque, acting on the second lever arm 72, is able to be generated with respect to the rotation axis 75. The extent and the direction of the torque which is produced in such a way depend respectively on the arrangement of the first lever arm 71 relative to the second lever arm 72 and on the arrangement of the spring element 85 relative to the two lever arms 71, 72.

In the present example, if the cover plate 50 is situated in the first position 50A (FIG. 1), the second lever arm 72 is arranged relative to the first lever arm 71 in such a way that the spring element 85 generates a torque, acting on the second lever arm 72, with respect to the rotation axis 75, which is directed in such a way that the cover plate 50 is held in the first position 50A by means of the torque generated by the spring element 85.

As FIG. 1 indicates, the pivoting device 65 can be equipped with a first mechanical stop 90 for the first lever arm 71 and/or for the second lever arm 72, wherein the first mechanical stop 90 is arranged in such a way that the first lever arm 71 and/or the second lever arm 72 is (or respectively are) in contact with the first mechanical stop 90, if the cover plate 50 is brought into the first position 50A, wherein the first lever arm 71 and/or the second lever arm 72 is (or respectively are) pressed against the first mechanical stop 90 by means of the torque generated by the spring element 85.

Furthermore, the pivoting device 65 can be optionally equipped with a sensor 95, which is formed to detect whether the first lever arm 71 is brought in contact with the first mechanical stop 90, and/or to detect whether the second lever arm 72 is brought in contact with the first mechanical stop 90. The sensor 95 enables a monitoring whether the cover plate 50 is situated currently in the first position 50A. Accordingly, the sensor 95 can be designed to generate a sensor signal which contains information as to whether the cover plate 50 is situated currently in the first position 50A. Furthermore, the sensor 95 can be designed to convey the sensor signal to a control device (not illustrated in the figures) of the beverage preparation machine 1, in order to enable a control of the beverage preparation machine 1 depending on this sensor signal.

In the present example furthermore, if the cover plate 50 is situated in an intermediate position between the first position 50A and the second position 50B, the second lever arm 72 is arranged relative to the first lever arm 71 in such a way that the spring element 85 generates a torque with respect to the rotation axis 75, acting on the second lever arm 72, which torque is directed in such a way that the cover plate 50 is movable by means of the generated torque into the second position 50B. Accordingly, in the present example, the arrangement of the first lever arm 71 and of the second lever arm 72 are selected in such a way that the cover plate 50 only has to be pivoted from the first position 50 into an intermediate position between the first position 50A and the second position 50B, in order to achieve that the cover plate 50, owing to the torque generated by the spring element 85, is pivoted automatically into the second position as soon as the cover plate is brought (manually, for example) into the intermediate position.

The spring element 85 can be arranged in particular in such a way that the cover plate 50 is able to be held in the second position 50B by means of the torque generated by the spring element 85.

As FIG. 1-3 indicate furthermore, the beverage preparation machine 1 can be equipped in addition optionally with at least one second mechanical stop 91 for the first lever arm 71 and/or for the second lever arm 72, wherein the at least one second mechanical stop 91 is arranged in such a way that the first lever arm 71 and/or the second lever arm 72 is (or respectively are) in contact with the at least one second mechanical stop 91, if the cover plate 50 is brought into the second position 50B, wherein the first lever arm 71 an/or the second lever arm 72 is (or respectively are) pressed by means of the torque generated by the spring element 84 against the at least one second mechanical stop 91. In the present example, in each case a second mechanical stop 91 is arranged both at one end of the first guide device 80 and also at one end of the second guide device 81 (FIG. 1-3).

As can be seen from FIG. 1-3, the beverage preparation machine 1 is equipped with a carrier 40 for the container 30, wherein the carrier 40 is formed in such a way that the container 30 is able to be placed in a predefined region 45B of the carrier 40, and the carrier 40, in so far as the cover plate 50 is situated in the second position, together with the container 30 placed in the predefined region 45B, is able to be introduced through the opening 11A into the inner space 10A, and the container 30 can be brought here to a predefined position in the inner space 10A, which position is selected in such a way that the cover plate 50 can be brought into the first position (FIG. 1).

The carrier 40, together with the container 30 placed in the predefined region 45B, is able to be guided out from the inner space 10A along a predefined path through the opening 11A, wherein the cover plate 50 is shaped in such a way that, in so far as the cover plate 50 is situated in the first position 50A, at least one region of the container 30 and/or at least one region of the carrier 40 is (or respectively are) able to be brought into a mechanical contact with the cover plate 50, when the carrier 40 together with the container 30 placed in the predefined region 45B is guided out from the inner space 10A along the predefined path through the opening 11A (FIG. 1).

As FIG. 1 indicates, the carrier 40 is shaped in such a way that at least one portion of the carrier 40 beneath a lower edge of the cover plate 50 projects out from the inner space 10A through the opening 11A, when the cover plate 50 is situated in the first position 50A, and the carrier 40 is placed in such a way that the container 30 is situated in the inner space 10A. The carrier 40 is therefore accessible for a user when the cover plate 50 is situated in the first position 50A, so that a user can take hold of the carrier 40 in order to draw the carrier 40 manually out of the inner space 10A through the opening 11A.

When the carrier 40 together with the container 30, placed in the predefined region 45B, is drawn out from the inner space 10A through the opening 11A, the cover plate 50 can be brought into a mechanical contact with at least one region of the container 30 and/or with at least one region of the carrier 40, in such a way that the cover plate 50 is able to be carried along with the container 30 and/or with the carrier 40, and in so doing can be pivoted out from the first position 50A about the pivot axis 60, so that the cover plate 50, on drawing out of the carrier 40, is taken along at least into an intermediate position between the first position 50A and the second position 50B.

As already mentioned, the spring element 85 is advantageously arranged in such a way that the spring element 85 generates a torque which is directed in such a way that the cover plate 50, after reaching the above-mentioned intermediate position, is automatically moved into second position 50B and is held in the second position 50B (FIG. 3).

Proceeding from the situation illustrated in FIG. 3, the carrier 40 together with the container 30 can be introduced into the inner space 10A, and the cover plate 50 can be pivoted manually from the second position 50B into the first position 50A, in order to cover and/or close the opening 11A again (FIG. 1). On pivoting of the cover plate 50 out from the second position 50B in the direction of the first position 50, the spring element 85 must be tensioned more and more elastically, so that the cover plate 50 can only be moved out of the second position 50B in the direction of the first position 50A by overcoming a restoring force generated by the spring element 85.

As FIG. 1-3 indicate, in the present example the carrier 40 comprises a lower part 50, into which there is integrated a residual fluid container 45A for receiving a residual fluid, and the predefined region 45B for receiving the carrier 40. The carrier 40 comprises in addition a cover 46, able to be placed onto the lower part 50, with which cover the residual fluid container 45A is able to be covered, and a drinking vessel tray 47, able to be placed onto the lower part 40, onto which tray drinking vessels are able to be set down during operation of the beverage preparation machine 1, which drinking vessels serve to receive the brewed beverages prepared by the beverage preparation machine 1 (details in this respect are not illustrated in the figures).

The invention claimed is:

1. A beverage preparation machine (1) for brewed beverages, which comprises:
   a housing (10) with a housing wall (11), which surrounds an inner space (10A) and has at least one opening (11A);
   a brewing device (20) arranged in the inner space (10A) for producing a brewed beverage by brewing a quantity of a solid material, accommodated by the brewing device (20), with a brewing fluid, wherein the quantity of the solid material accommodated by the brewing device (20) is enabled to be output from the brewing device (20);
   a movable container (30) for receiving a quantity of the solid material output from the brewing device (20), which container (30) is configured to be brought into the inner space (10A) through the opening (11A); and
   a movable cover plate (50) for covering the opening (11A), wherein the cover plate (50) is configured to be brought at least into a first position (50A) and into a second position (50B) and is formed in such a way that in the first position (50A) it covers and/or closes at least one region of the opening (11A) and in the second position (50B) uncovers the opening (11A) in such a way that the container (30) is enabled to be moved through the opening (11A);
   wherein the cover plate (50) is connected to the housing (10) via a pivoting device (65), so that the cover plate (50) is configured to be pivoted about a pivot axis (60) and by pivoting about this pivot axis (60) is movable between the first position (50A) and the second position (50B);
   wherein the pivoting device (65) comprises a first lever arm (71), which is securely connected to the cover plate (50) and is mounted rotatably about the pivot axis (60);
   wherein the pivoting device (65) has a second lever arm (72), which is rotatably mounted on the first lever arm (71), so that the second lever arm (72) is rotatable with respect to the first lever arm (71) about a rotation axis (75), which is arranged substantially parallel to the pivot axis (60) and at a distance from the pivot axis (60), wherein the pivoting device (65) comprises in addition a first guide device (80), which is formed to guide a first portion (72A) of the second lever arm (72) along a first guide curve (80A), wherein the first guide curve extends in such a way that the first portion (72A) of the second lever arm (72) on a pivoting movement of the cover plate (50) between the first position (50A) and the second position (50B) is moved along the first guide curve (80A); and
   wherein a spring element (85) is arranged in such a way that a first portion of the spring element (85) is fastened to the second lever arm (72) at a distance from the rotation axis (75), and a second portion of the spring element (85) is fixed relative to the first lever arm (71) and/or to the housing (10).

2. The beverage preparation machine (1) according to claim 1, wherein the spring element (85) is pre-stressed, so that by means of the spring element (85) a torque, acting on the second lever arm (72), is able to be generated with respect to the rotation axis (75).

3. The beverage preparation machine (1) according to claim 2, wherein, if the cover plate (50) is situated in the first position (50A), the second lever arm (72) is arranged relative to the first lever arm (71) in such a way that the spring element (85) generates a torque, acting on the second lever arm (72), with respect to the rotation axis (75), which torque is directed in such a way that the cover plate (50) is held in the first position (50A) by means of the torque generated by the spring element (85).

4. The beverage preparation machine (1) according to claim 2, with a first mechanical stop (90) for the first lever arm (71) and/or for the second lever arm (72), wherein the first mechanical stop (90) is arranged in such a way that the first lever arm (71) and/or the second lever arm (72) is or respectively are in contact with the first mechanical stop (90), if the cover plate (50) is brought into the first position (50A), wherein the first lever arm (71) and/or the second lever arm (72) is or respectively are pressed against the first mechanical stop (90) by means of the torque generated by the spring element (85).

5. The beverage preparation machine (1) according to claim 4, with a sensor (95), which is formed to detect whether the first lever arm (71) is brought in contact with the first mechanical stop (90), and/or to detect whether the second lever arm (72) is brought in contact with the first mechanical stop (90).

6. The beverage preparation machine (1) according to claim 2, wherein, if the cover plate (50) is situated in the first position (50A) or in an intermediate position between the first position (50A) and the second position (50B), the second lever arm (72) is arranged relative to the first lever arm (71) in such a way that the spring element (85) generates a torque, acting on the second lever arm (72), with respect to the rotation axis (75), which torque is directed in such a way that the cover plate (50) is movable into the second position (50B) by means of the generated torque.

7. The beverage preparation machine (1) according to claim 6, wherein the cover plate (50) is configured to be held in the second position (50B) by means of the torque generated by the spring element (85).

8. The beverage preparation machine (1) according to claim 6, with at least one second mechanical stop (91) for the first lever arm (71) and/or for the second lever arm (72), wherein the at least one second mechanical stop (91) is arranged in such a way that the first lever arm (71) and/or the second lever arm (72) is or respectively are in contact with the at least one second mechanical stop (91), if the cover plate (50) is brought into the second position (50B), wherein the first lever arm (71) and/or the second lever arm (72) is or respectively are pressed against the at least one second mechanical stop (91) by means of the torque generated by the spring element (85).

9. The beverage preparation machine (1) according to claim 1, wherein
the pivoting device (65) comprises a second guide device (81), which is formed to guide a second portion (72B) of the second lever arm (72) along a second guide curve (81A), wherein the second guide curve (81A) extends in such a way that the second portion (72B) of the second lever arm (72) is moved along the second guide curve (81A) on a pivoting movement of the cover plate (50) between the first position (50A) and the second position (50B).

10. The beverage preparation machine (1) according to claim 1,
with a carrier (40) for the container (30), wherein the carrier (40) is formed in such a way that the container (30) is able to be placed in a predefined region (45B) of the carrier (40), and the carrier (40), in so far as the cover plate (50) is situated in the second position, is enabled to be introduced, together with the container (30) placed in the predefined region (45B), through the opening (11A) into the inner space (10A), and the container (30) is enabled to be brought here to a predefined position in the inner space (10A), which is selected in such a way that the cover plate (50) is enabled to be brought into the first position.

11. The beverage preparation machine (1) according to claim 10,
wherein the carrier (40), together with the container (30) placed in the predefined region (45B), is enabled to be guided out of the inner space (10A) along a predefined path through the opening (11A); and
wherein the cover plate (50) is shaped in such a way that, in so far as the cover plate (50) is situated in the first position (50A), at least one region of the container (30) and/or the at least one region of the carrier (40) is or respectively are able to be brought into a mechanical contact with the cover plate (50), when the carrier (40) together with the container (30) placed in the predefined region (45B) is guided out from the inner space (10A) along the predefined path through the opening (11A).

12. The beverage preparation machine (1) according to claim 11, wherein the cover plate (50) is enabled to be brought into a mechanical contact with the at least one region of the container (30) and/or with the at least one region of the carrier (40) in such a way that the cover plate (50) is enabled to be taken along with the container (30) and/or with the carrier (40) and in so doing is pivotable out from the first position (50A) about the pivot axis (60), when the carrier (40) together with the container (30), placed in the predefined region (45B), is guided out from the inner space (10A) along the predefined path through the opening (11A).

13. The beverage preparation machine (1) according to claim 10, wherein the carrier (40) comprises a residual fluid container (45A) for receiving a residual fluid, which is enabled to be output in an operation of the beverage preparation machine (1).

14. The beverage preparation machine (1) according to claim 1, wherein the brewing device (20) is formed for producing at least one of the following brewed beverages: coffee and/or tea.

* * * * *